(12) United States Patent
Xiao et al.

(10) Patent No.: US 10,480,312 B2
(45) Date of Patent: *Nov. 19, 2019

(54) ELECTRICAL SUBMERSIBLE PUMP FLOW METER

(71) Applicant: Saudi Arabian Oil Company, Dhahran (SA)

(72) Inventors: Jinjiang Xiao, Dhahran (SA); Randall Alan Shepler, Ras Tanura (SA)

(73) Assignee: Saudi Arabian Oil Company (SA)

( * ) Notice: Subject to any disclaimer, the term of this patent is extended or adjusted under 35 U.S.C. 154(b) by 334 days.

This patent is subject to a terminal disclaimer.

(21) Appl. No.: 15/349,054

(22) Filed: Nov. 11, 2016

(65) Prior Publication Data

US 2017/0058664 A1     Mar. 2, 2017

Related U.S. Application Data

(63) Continuation-in-part of application No. 13/546,694, filed on Jul. 11, 2012, now Pat. No. 9,500,073.

(Continued)

(51) Int. Cl.
*E21B 47/10* (2012.01)
*E21B 43/12* (2006.01)
(Continued)

(52) U.S. Cl.
CPC ............ *E21B 47/10* (2013.01); *E21B 43/128* (2013.01); *E21B 47/06* (2013.01); *G01F 1/36* (2013.01)

(58) Field of Classification Search
CPC .... E21B 43/126; E21B 43/121; E21B 43/127; E21B 47/06; E21B 47/10; E21B 43/128; G01F 1/36; F04B 2207/02

See application file for complete search history.

(56) References Cited

U.S. PATENT DOCUMENTS

| 4,397,190 A | 8/1983 | Hulin |
| 4,829,831 A | 5/1989 | Kefer et al. |

(Continued)

FOREIGN PATENT DOCUMENTS

| GB | 2411188 A | 8/2005 |
| UA | 2411188 A | 8/2005 |

(Continued)

OTHER PUBLICATIONS

International Search Report and Written Opinion for Related PCT Application PCT/US2017/060768, dated Nov. 9, 2017.

(Continued)

*Primary Examiner* — Daniel S Larkin
*Assistant Examiner* — Anthony W Megna Fuentes
(74) *Attorney, Agent, or Firm* — Bracewell LLP; Constance G. Rhebergen

(57) ABSTRACT

An apparatus for metering fluid in a subterranean well includes an electric submersible pump having a motor, a seal section and a pump assembly and a metering assembly. The metering assembly includes an upper pipe section with an outer diameter, the upper pipe section having an upper pressure sensing means, and a lower pipe section with an outer diameter smaller than the outer diameter of the upper pipe section, the lower pipe section having a lower pressure sensing means. A power cable is in electronic communication with the electric submersible pump and with the metering assembly.

8 Claims, 3 Drawing Sheets

Related U.S. Application Data

(60) Provisional application No. 61/540,639, filed on Sep. 29, 2011.

(51) Int. Cl.
*E21B 47/06* (2012.01)
*G01F 1/36* (2006.01)

(56) References Cited

U.S. PATENT DOCUMENTS

| | | |
|---|---|---|
| 4,856,344 A | 8/1989 | Hunt |
| 5,608,170 A | 3/1997 | Atkinson et al. |
| 5,693,891 A | 12/1997 | Brown et al. |
| 5,736,650 A | 4/1998 | Hiron et al. |
| 6,776,054 B1 | 8/2004 | Stephenson et al. |
| 7,086,294 B2 | 8/2006 | DeLong et al. |
| 7,107,860 B2 | 9/2006 | Jones |
| 8,330,617 B2 | 12/2012 | Chen et al. |
| 2005/0039544 A1 | 2/2005 | Jones |
| 2005/0173114 A1* | 8/2005 | Cudmore ............ E21B 43/121 166/250.15 |
| 2006/0131014 A1 | 6/2006 | Huang et al. |
| 2008/0098825 A1 | 5/2008 | Huntsman et al. |
| 2008/0264182 A1 | 10/2008 | Jones et al. |
| 2009/0293634 A1 | 12/2009 | Ong |
| 2009/0308601 A1 | 12/2009 | Poe et al. |
| 2010/0067329 A1 | 3/2010 | Edwards et al. |
| 2010/0181067 A1 | 7/2010 | Chen et al. |
| 2010/0194585 A1 | 8/2010 | Skinner et al. |
| 2010/0199780 A1 | 8/2010 | Ong |
| 2011/0083839 A1 | 4/2011 | McCoy et al. |
| 2013/0081460 A1 | 4/2013 | Xiao et al. |
| 2015/0176397 A1 | 6/2015 | Shanks |
| 2015/0292317 A1 | 10/2015 | Flores |

FOREIGN PATENT DOCUMENTS

| | | |
|---|---|---|
| WO | WO0042391 | 7/2000 |
| WO | 2013049574 A2 | 4/2013 |

OTHER PUBLICATIONS

Williams, A.J. (Sandy), "Demystifying ESPs: A Technique to Make Your ESP Talk to You," 6th European Electric Submersible Pump Round Table, Aberdeen, Section, pp. 1-19, Society of Petroleum Engineers.

Web Page for Weatherford, Red Eye 2G Water-Cut Meter, found at www/weatherford.com/products/production/flowmeasurement/RedEye%C2%AE2GWater-CutMeter/.

International Search Report and Written Opinion dated Oct. 30, 2013 for related pct application PCT/US2012/057925.

* cited by examiner

ELECTRICAL SUBMERSIBLE PUMP FLOW METER

CROSS-REFERENCE TO RELATED APPLICATION

This application is a continuation in part of and claims priority to and the benefit of co-pending U.S. patent application Ser. No. 13/546,694, filed Jul. 11, 2012, which claimed priority from U.S. Provisional Application Ser. No. 61/540,639, filed Sep. 29, 2011, the full disclosures of which are incorporated by reference herein in their entireties and for all purposes.

BACKGROUND OF THE INVENTION

Field of the Invention

The present invention relates to electrical submersible pumps. More specifically, the invention relates a flow meter used in conjunction with an electrical submersible pump.

Description of the Related Art

In hydrocarbon developments, it is common practice to use electric submersible pumping systems (ESPs) as a primary form of artificial lift. ESPs often use downhole monitoring tools to supply both temperature and pressure readings from different locations on the ESP. For example, intake pressure, discharge pressure, and motor temperature, as well as other readings may be taken on the ESP.

If wells are producing below bubble point pressure, the liberated gas, at the surface, may not allow the surface meters to provide accurate flow rates. To replace the surface single phase meters with multi-phase meters can cost tens of thousands of dollars per well. Downhole at the ESP a significant percentage of wells are producing with intake pressures well above the bubble point pressure. Therefore, being able to measure flow rate down hole at the ESP would allow for an accurate flow meter that will assist immensely in extending the life of the ESPs. Therefore, a low cost and accurate flow meter that will assist immensely in extending the life of the ESPs that incorporates these theories would be desirable.

SUMMARY OF THE INVENTION

Disclosed herein is an example of an apparatus for monitoring a flow of fluid in a subterranean well, and that includes a first pipe section selectively disposed in the flow of fluid, a first pressure sensor on the first pipe section that measures a first pressure loss of the flow of fluid along at least a portion of the first pipe section, the first pressure loss made up of first gravitational losses and first frictional losses, a second pipe section spaced axially away from the first pipe section and that is selectively disposed in the flow of fluid, a second pressure sensor on the second pipe section that measures a second pressure loss of the flow of fluid along at least a portion of the second pipe section and that is made up of second gravitational losses and second frictional losses, the second pipe section having an outer diameter that is less than an outer diameter of the first pipe section so that the second frictional losses are negligible with respect to the second gravitational losses, a controller in communication with the first and second pressure sensors and that calculates a pressure gradient along a portion of the second pipe section based on the equation $PG=(g)(\rho_m)/((g_c)(144))$, and a communication media in communication with the controller and with the first and second pressure sensors, so that signals representing the first and second pressure losses are communicated to the controller. In an embodiment, the first and second pressure sensors each have sensor systems having axially spaced apart sensors that measure a pressure gradient. The apparatus can further have pressure transmitters in communication with the first and second sensors and the communication media. The first and second pipe sections can be coupled together to define a metering assembly, and wherein an end of the metering assembly can be attached to an electrical submersible pump. In an example, a power source is included that is in communication with the electrical submersible pump. Alternatively, a power cable provides electrical communication between the power source and the electrical submersible pump, and wherein signals between the first and second pressure sensors are transmitted to the controller along the power cable. In an example, the flow of fluid travels along a path that passes inside of the first and second pipe sections. Alternatively, the flow of fluid travels along a path that passes through an annular space between the first and second pipe sections and a sidewall of the well.

Also disclosed herein is another example of an apparatus for monitoring a flow of fluid in a subterranean well, and that includes an upper pipe section selectively disposed in the flow of fluid, an upper pressure sensor on the upper pipe section that measures an upper pressure loss of the flow of fluid along at least a portion of the upper pipe section, the upper pressure loss made up of upper gravitational losses and upper frictional losses, a lower pipe section selectively disposed in the flow of fluid, a lower pressure sensor on the lower pipe section that measures a lower pressure loss of the flow of fluid along at least a portion of the lower pipe section, the lower pressure loss made up of lower gravitational losses and lower frictional losses, the lower pipe section having an outer diameter that is less than an outer diameter of the upper pipe section so that the lower frictional losses are negligible with respect to the lower gravitational losses, and a controller in communication with the upper and lower pressure sensors and that calculates a flowrate of the flow of fluid based on upper and lower gravitational losses, upper frictional losses, and that ignores the lower frictional losses. In an example, the upper pipe sections, the lower pipe sections, the upper pressure sensor, and the lower pressure sensor define a metering assembly. In one alternative, an end of the metering assembly is coupled to an electrical submersible pump that pressurizes fluid from the flow of fluid, and wherein the flowrate calculated by the controller is substantially the same as a flowrate of a flow of fluid that is being pressurized by the electrical submersible pump. In one embodiment, the upper pressure sensor includes pressure sensors that are axially spaced apart on the upper pipe section. The lower pressure sensor can include pressure sensors that are axially spaced apart on the lower pipe section. In an example, the controller estimates a pressure gradient ("PG") along a portion of the lower pipe section with the equation: $PG=(g)(\rho_m)/((g_c)(144))$. The controller can estimate a water cut percentage of the flow of fluid based on the equation. In an alternate example, the controller estimates the flowrate of the flow of fluid based on a relationship where a pressure gradient difference between the upper and lower pipe sections is: $(f\rho_m v^2_m)/(24 g_c D_h)$. A production string can be included that is in fluid communication with the upper and lower pipe sections.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE EXEMPLARY EMBODIMENTS

Figure 1:
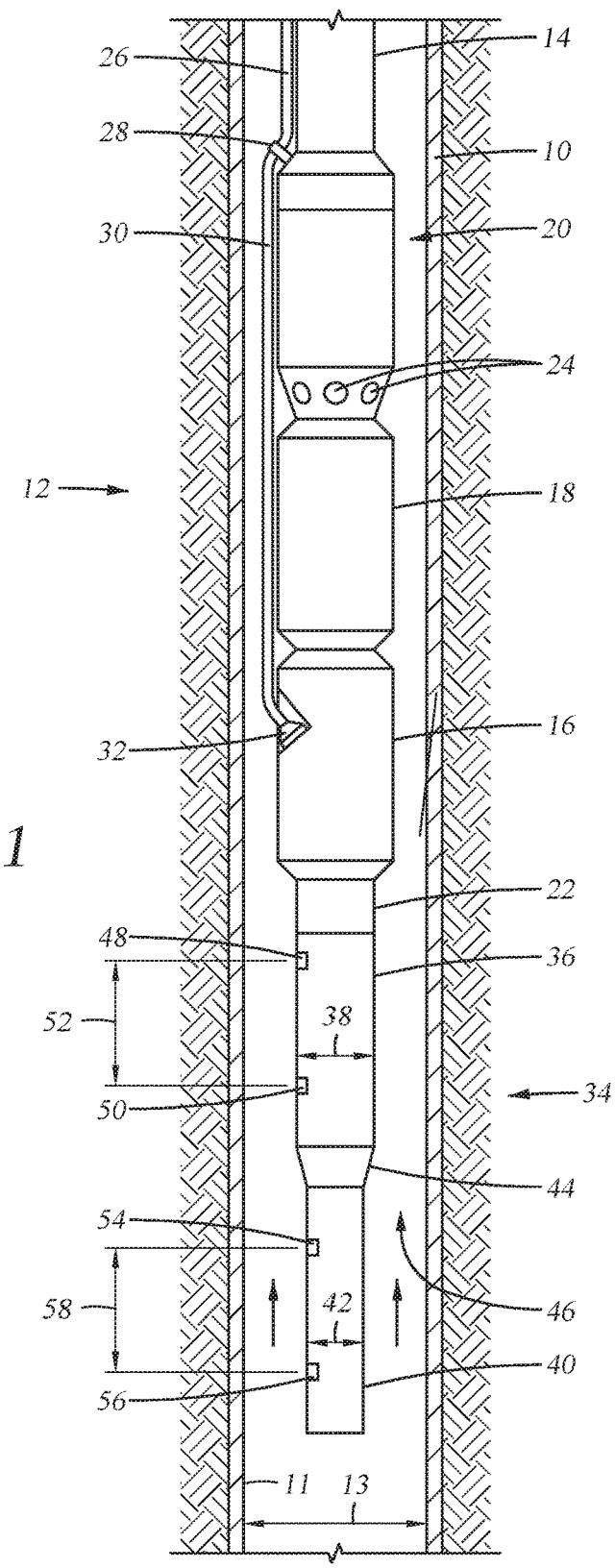
FIG. 1 is an elevational view of an electrical submersible pump with a flow meter of an embodiment of the current application.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side sectional view in FIG. 1 is an example of a well 10 having one embodiment of an electric submersible pump ("ESP") 12 disposed therein. As shown, ESP 12 depends from an end of a tubing string 14 disposed in the well 10. In the illustrated example, well 10 has in internal bore 11 with a diameter 13. Included with the example of the ESP 12 is an electric motor 16 with a seal section 18 disposed adjacent motor 16. In an example, seal section 18 equalizes pressure within ESP 12 with ambient pressure to reduce pressure differentials on fluid seals in the ESP 12 and thereby prevent well fluid from entering motor 16. ESP 12 also includes a pump section comprising pump assembly 20 located on an end of seal section 18 distal from motor 16. Examples exist where the pump assembly 20 includes a pump such as a centrifugal pump. Pump assembly 20 could alternatively include a progressing cavity pump, which has a helical rotor that rotates within an elastomeric stator. An ESP monitoring tool 22 is located below electric motor 16. In the illustrated example, monitoring tool 22 monitors various pressures, temperatures, and vibrations associated with the ESP 12. In the example of FIG. 1, ESP 12 lifts well fluids from within the well 10 to the surface. Fluid inlets 24 located on pump assembly 20 define an entryway for fluid to enter into ESP 12.

In the embodiment of FIG. 1, a power cable 26 extends alongside production tubing 14, terminating in a splice or connector 28 that electrically couples cable 26 to a second power cable, or motor lead 30. An end of motor lead 30 distal from power cable 26 connects to a pothead connector 32 that electrically connects and secures motor lead 30 to electric motor 16. Coupled with ESP 12 on an end distal from tubing string 14 is an example of a metering assembly 34. Metering assembly 34 includes an upper pipe section 36 shown mounted to monitoring tool 22 of ESP 12. In the illustrated example, upper pipe section 36 is an elongated member having a curved outer periphery thereby having a cylinder like outer surface. Upper pipe section 36 has an external diameter 38. Metering assembly 34 also includes a lower pipe section 40 located on a side of upper pipe section 36 distal from motor 16. Lower pipe section 40 is also elongated with a curved outer periphery to have a generally cylindrically shaped outer surface. External diameter 42 of lower pipe section 40 has a magnitude less than that of the external diameter 38 of upper pipe section 36. A tapered intermediate pipe section 44 mates the upper pipe section 36 to lower pipe section 40. The intermediate pipe section 44 is tapered or swaged in such a manner to create a smooth transition between larger diameter upper pipe section 36 to the smaller diameter lower pipe section 40 to minimize the sudden flow disturbance and pressure losses within bore 11.

As an example, each of upper pipe section 36 and lower pipe section 40 may have a length of 15 to 20 feet. For a metering assembly 34 deployed inside a well 10 with an internal diameter of 7 inches, which may be, for example, the internal diameter of the casing completion, the external diameter 42 of lower pipe section 40 may be 3.5 inches or smaller and the external diameter 38 of upper pipe section 36 my be 5.5 inches. As a second example, for a metering assembly 34 deployed inside a well 10 with an internal diameter of 9⅝ inches, which may be, for example, the internal diameter of the casing completion, the external diameter 42 of lower pipe section 40 may be 4.5 inches or smaller and the external diameter 38 of upper pipe section 36 my be 7 inches.

As described, the external diameters 38, 42 of upper and lower pipe sections 36, 40 are smaller than the internal diameter 13 of the bore 11 of well 10. The annular spaces between external diameters 38, 42 and bore 11 create an annular flow path 46 for the passage of fluids within the well 10 as the fluid flows towards fluid inlets 24 of pump assembly 20. A pressure sensing means is located on upper pipe section 36 and lower pipe section 40. In the illustrated example, the upper pressure sensing means includes two upper flow pressure sensors 48, 50 located on upper pipe section 36. The upper sensors 48, 50 as shown are located at an upper distance 52 apart from each other and selectively collect data from fluid flowing exterior to the upper and lower pipe sections 36, 40 in the annular flow path 46. Embodiments exist where upper distance 52 ranges from around 10 to 15 feet, and all distances within this range. Alternatively, a single pressure differential sensor may be used to measure the pressure difference between the two upper locations. As illustrated, the lower pressure sensing means includes two lower flow pressure sensors 54, 56 located on lower pipe section 40. The lower sensors 54, 56 are located at a lower distance 58 apart from each other. In one example lower distance 58 ranges from around 10 feet to around 15 feet, and all distances within this range. In an alternative, a single pressure differential sensor is used to measure the pressure difference between the two lower locations.

Because of the differences in the outer diameter 38 of upper pipe section of upper pipe section 36 and outer diameter 42 of lower pipe section 40, two distinctive flow regimes are created along the annulus flow path 46. One distinctive flow regime extends along lower distance 58 and another distinctive flow regime extends along upper distance 52. In a non-limiting example of operation, a first pressure loss is measured over lower distance 58. In this example, the first pressure loss is determined by measuring a pressure with first lower sensor 56 and second lower sensor 54 and finding the difference between the two pressure readings. Alternatively, a single pressure differential sensor measures the first pressure loss. While the first pressure loss includes both gravitational and frictional losses, the gravitational losses exceed the frictional losses by an amount such that a sufficiently accurate estimate of the first pressure loss is calculated by ignoring the frictional losses. For the purposes of discussion herein, an example of a sufficiently accurate estimate includes calculation results that are within a margin of error so that a difference between calculations or other evaluations using the sufficiently accurate estimate are within an acceptable margin from calculations that account for the frictional losses. In one example, an acceptable margin would mean that a calculated size of something being designed to accommodate the flow fluid is substantially the same when accounting for frictional losses or not accounting for frictional losses. As such, in an example of evaluating the first pressure loss the frictional losses between sensors 54, 56 are ignored and only the gravitational losses considered.

In one non-limiting example of operation the second pressure loss is determined by measuring a pressure in the fluid with first upper sensor 50 and second upper sensor 48 and finding the difference between the two pressure readings. In an alternative a single pressure differential sensor measures the second pressure loss. Because of the relatively larger external diameter 38 of upper pipe section 36, the second pressure loss is made up of substantial amounts of both gravitational loss and frictional loss, so that an accurate estimate of the second pressure includes both gravitational and frictional pressure losses. In the illustrated example, the pressure loss data collected by sensors 48, 50, 54, and 56 is transmitted to surface along the power cable 26, which is in communication with the metering assembly 34 through ESP monitoring tool 22. In an embodiment, the flow rate of the fluids within well 10 and the water cut of such fluids is calculated with this pressure loss data using hydraulic equations as further describe herein. More specifically in this example, the first pressure loss estimated via the first and second lower sensors 56, 54 (or with a single pressure differential sensor) is used to calculate oil-water mixture density and the production water cut. Further in this example, the second pressure loss, calculated with data from first upper sensor 50 and second upper sensor 48 (or with a single pressure differential sensor) is used to calculate oil-water mixture flowrate.

Figure 2:
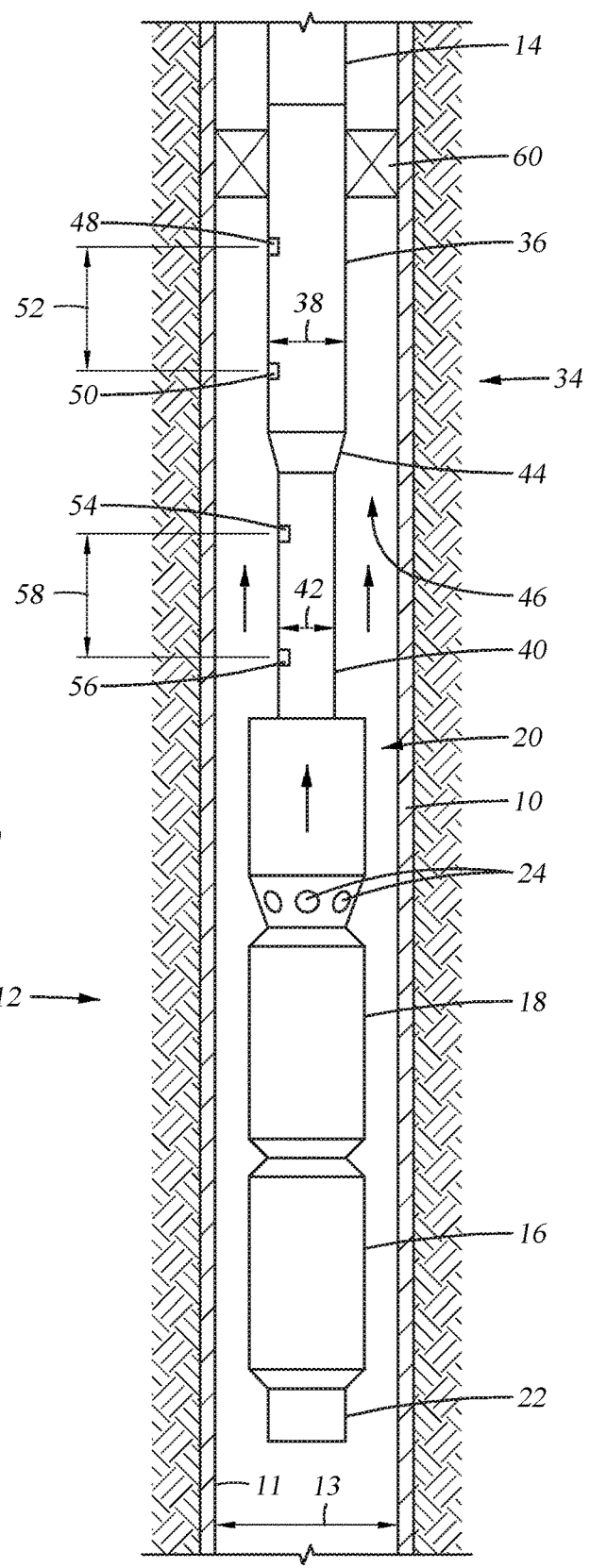
FIG. 2 is an elevational view of an electrical submersible pump with a flow meter of an alternative embodiment of the current application.

Referring now to FIG. 2, shown in a side partial sectional view is an alternate embodiment of ESP 12 having an electric motor 16, seal section 18 adjacent motor 16, and pump assembly 20 on a side of seal section 18 distal from motor 16. In this example metering assembly 34 is disposed adjacent a side of pump assembly 20 distal from seal section 18 with lower pipe section 40 mounted to a discharge end of pump assembly 20. ESP monitoring tool 22 is shown adjacent electric motor 16 and distal from seal section 18. Fluid inlets 24 on pump assembly 20 define a passage for receiving fluid into ESP 12. The fluids then continue upwards within lower pipe section 40 and upper pipe section 36, and then discharged into tubing string 14, where tubing string couples to an end of upper pipe section 36 distal from lower pipe section 40. As shown, lower pipe section 40 has an internal diameter 42 which is smaller than the internal diameter 38 of upper pipe section 36. A tapered intermediate pipe section 44 mates the upper pipe section 36 to lower pipe section 40. The intermediate pipe section 44 is tapered in such a manner to create a smooth transition between upper pipe section 36 to lower pipe section 40 to minimize the sudden flow disturbance and pressure losses in fluid flowing along this flow path.

As an example, each of upper pipe section 36 and lower pipe section 40 have lengths that range from about 15 feet to about to 20 feet, and all distances within this range. For a metering assembly 34 deployed inside a well 10 with an internal diameter of 7 inches, which may be, for example, the internal diameter of the casing completion, the internal diameter 42 of lower pipe section 40 ranges up to about 3.5 inches, and the internal diameter 38 of upper pipe section 36 ranges up to about 5.5 inches.

As described, the internal diameters 38, 42 of upper and lower pipe sections 36, 40 are smaller than the internal diameter 13 of the bore 11 of well 10. An example of a packer 60 is depicted sealingly engaged between upper pipe section 36 and the bore 11. Packer 60 blocks flow path 46 so that fluids are diverted into fluid inlets 24, to be pressured by pump assembly 20 and then transported to the surface through tubing string 14.

Examples of a upper and lower pressure sensing means are located on upper pipe section 36 and lower pipe section 40. The upper pressure sensing means as shown includes two upper flow pressure sensors 48, 50 located on upper pipe section 36. The upper sensors 48, 50 are located at an upper distance 52 apart from each other. In an embodiment, upper distance 52 ranges from about 10 feet to about 15 feet, and all distances within this range. Alternatively, a single pressure differential sensor measures the pressure difference between the two upper locations. The lower pressure sensing means is illustrated as having two lower flow pressure sensors 54, 56 located on lower pipe section 40. The lower sensors 54, 56 are located at a lower distance 58 apart from each other. Lower distance 58 optionally ranges from about 10 feet to about 15 feet, and all distances within this range. Alternatively, a single pressure differential sensor measures the pressure difference between the two lower locations. The sensor means of FIG. 2 selectively collects data from fluid flowing inside of lower pipe section 40 and upper pipe section 36

Because of the differences in the inner diameter 38 of upper pipe section 36 and inner diameter 42 of lower pipe section 40, two distinctive flow regimes are created, one along lower distance 58 and another along upper distance 52. In one non-limiting example, a pressure loss is measured over lower distance 58. The pressure loss is determined by measuring a pressure with first lower sensor 56 and second lower sensor 54 and finding the difference between the two pressure readings. Alternatively, a single pressure differential sensor can measure the pressure loss. Because of the relatively smaller internal diameter 42 of lower pipe section 40, gravitational losses and friction losses both significantly contribute to the pressure loss so that a precise estimate of the pressure loss requires that each of these types of losses be considered and neither can be ignored.

Further in this example, another pressure loss is measured over upper distance 52. This pressure loss is determined by measuring a pressure with first upper sensor 50 and second upper sensor 48 and finding the difference between the two pressure readings. Alternatively, a single pressure differential sensor can measure this pressure loss. Because of the relatively larger internal diameter 38 of upper pipe section 36 and lower flow velocity in this region, gravitational losses of the fluid between the first and second upper sensors 50, 48 are the primary losses contributing to this pressure loss. Accordingly, a precise value of pressure losses in the fluid flowing between the first and second upper sensors 50, 48 can be estimated by ignoring the frictional losses of the fluid flowing in this region.

In a non-limiting example of operation, pressure loss data collected by sensors 48, 50, 54, and 56 is transmitted to surface for evaluation. In an alternative, the data is transmitted along power cable 26 (FIG. 1), which is in communication with metering assembly 34 through the ESP monitoring tool 22. Further in this example, the flow rate of the fluids within well 10, the fluid density, and the water cut of such fluids is calculated with this pressure loss data using hydraulic equations as further described herein. More specifically, the first pressure loss is calculated with data from the first upper sensor 48 and second upper sensor 50 (or with a single pressure differential sensor), the first pressure loss is also used to calculate oil-water mixture density and the production water cut. The second pressure loss is calculated with data from first lower sensor 54 and second lower sensor 56 (or with a single pressure differential sensor) is used to calculate oil-water mixture flowrate.

In the embodiment of FIG. 1, the water cut is calculated by first finding the pressure gradient (psi/ft) over lower distance 58, i.e. $DP_1/L_1$. As the gravitational loss is the major contributor to pressure loss over lower distance 58, in an example embodiment the frictional loss is ignored when estimating this pressure gradient. Ignoring frictional loss results in a relationship for pressure gradient that is illustrated by Equation 1 below:

$$PG=(g)(\rho_m)/((g_c)(144)) \quad \text{Equation 1}$$

Where g is the gravitational acceleration, 32.2 ft/sec², $g_c$ is a unit conversion factor, 32.2 lbm-ft/lbf-sec², and $\rho_m$ is the oil-water mixture density in lbm/ft³. After determining $\rho_m$ from Equation 1, production water cut can be calculated. A similar analysis could be performed over upper distance 52 of the embodiment of FIG. 2 because this pressure loss is affected primarily by gravitational loss such that the frictional losses of fluid flowing in this region are sufficiently negligible that they can be ignored without impacting the precision of the resulting calculation.

Returning to the embodiment of FIG. 1, a pressure gradient (psi/ft) over upper distance 52 is estimated and expressed as $DP_2/L_2$. Here, the respective values of gravitational losses and frictional losses have magnitudes that are sufficiently high in relation to one another so that ignoring either the gravitational or frictional loss would produce inaccurate hydraulic calculations for the fluid flowing along upper distance 52. For this region of fluid flow the frictional pressure gradient results in the relationship of Equation 2 below:

$$PG_2-PG_1=(f\rho_m v^2 m)/(24g_c D_h) \quad \text{Equation 2}$$

Where $v_m$ is the oil-water mixture velocity in ft/sec in upper distance 52, $D_h$ is the hydraulic diameter for the annulus in inches, calculated as internal diameter 13 minus external diameter 38, and f is the friction factor. A similar analysis would also apply to the lower distance 58 of the embodiment of FIG. 2 where the pressure loss is dominated by both gravitational and friction losses.

The friction factor is a function of Reynolds number and roughness, and can be determined from Moody's chart or empirical correlations. Equation 2 can be used iteratively to obtain the mixture velocity and the total oil-water flowrate. With water cut calculated previously, the individual oil and water rates can be easily calculated.

Figure 3:
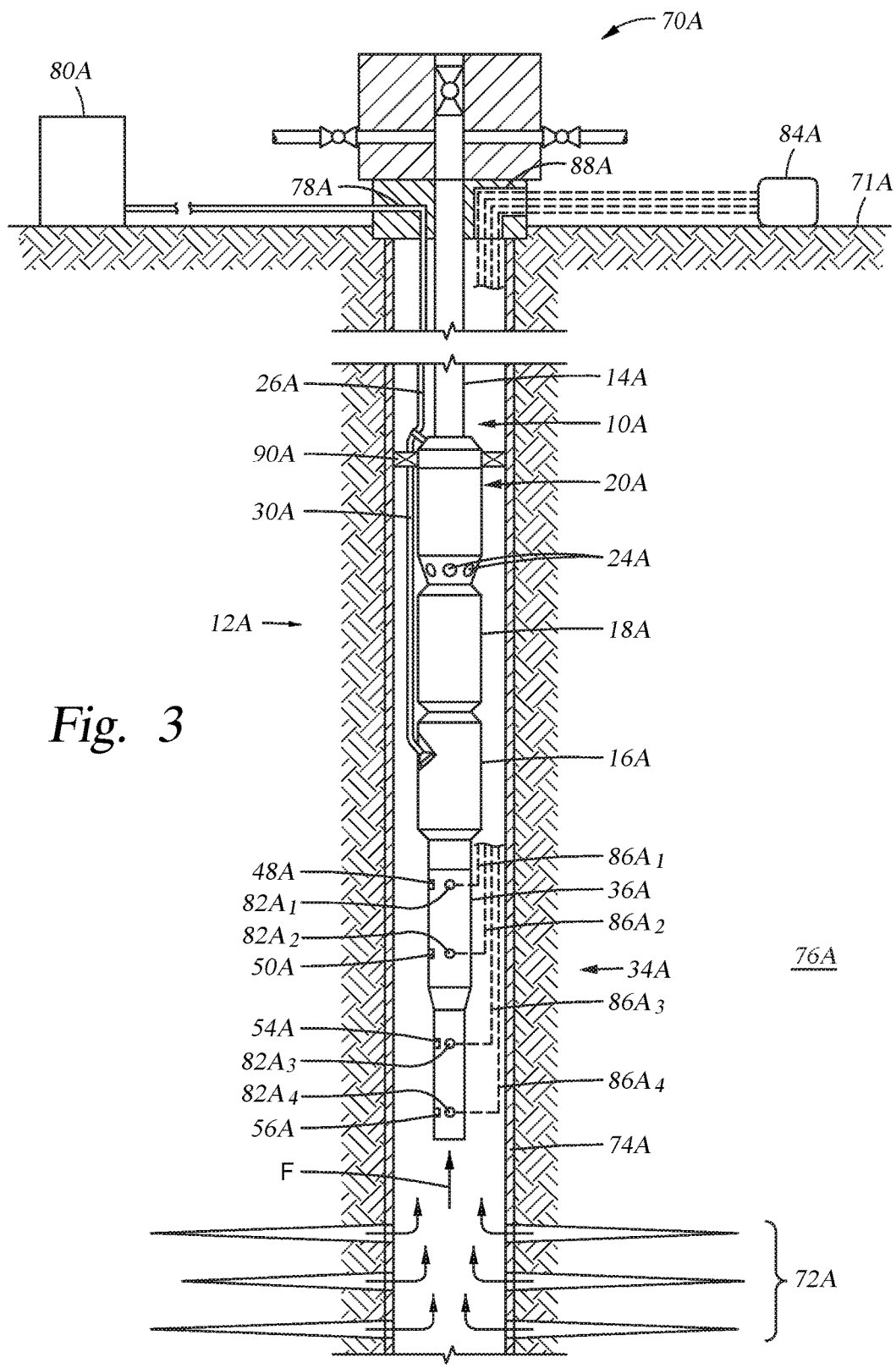
FIG. 3 is a side sectional view of an alternate embodiment of the electrical submersible pump and flow meter of FIG. 1.

Referring now to FIG. 3, shown in a side sectional view is an alternate example of the ESP 12A and metering assembly 34A of FIG. 1. As shown, an end of the tubing 14A distal from pump assembly 20A couples with a wellhead assembly 70A shown mounted on surface 71A and above an opening of the well 10A. In the illustrated example, fluid F flows into well 10A from perforations 72A that project radially outward from well 10A. The perforations 72A extend through casing 74A that lines the well 10A, and into formation 76A that surrounds well 10A. The fluid F produced from the formation 76A is pressurized in pump assembly 20A after being drawn into pump assembly 20A via fluid inlets 24A. The pressurized fluid is discharged into the tubing string 14A and routed to the wellhead assembly 70A for distribution to storage and/or process facilities (not shown). Further illustrated in FIG. 3 is the power cable 26A extending generally parallel with the tubing 14A between the motor lead 30A and the wellhead assembly 70A. At the wellhead assembly 70A, the power cable 26A is routed through a passage 78A, which has an end that intersects a surface of the wellhead assembly 70A that faces the well 10A. An opposite end of the passage 78A intersects a surface of wellhead assembly 70A outside of the well 10A and above surface 71A. After exiting the end of the passage 78A above surface 71A, the power cable 26A connects to a power supply 80A shown on surface 71A. Examples of the power supply 80A include an electrical grid, a transformer, a generator, any other means of providing electricity, and combinations thereof. Electricity from the power supply 80A is selectively conducted via power cable 26A to ESP 12A for powering pump assembly 20A. Optionally, a variable frequency generator and controls (not shown) are included in the power supply 80A.

Further in the example of FIG. 3, pressure transmitters 82A$_{1-4}$ are shown connected respectfully to pressure sensors 48A, 50A, 54A, 56A. Here, pressure transmitters 82$_{1-4}$ send signals to a controller 84A shown on surface 71A and outside of well 10A, where the signals communicated by pressure transmitters 82$_{1-4}$ represent ambient conditions of fluid F in the well 10A that are sensed by pressure sensors 48A, 50A, 54A, 56A. In an example, the controller 84A includes an information handling system ("IHS"); embodiments exist where the IHS includes a processor, memory accessible by the processor, nonvolatile storage area accessible by the processor, and logics for performing each of the steps above described. Controller 84A receives the signals and translates the signals into a form, such as data or information, that is recognizable by the controller 84A, and performs operations based on the recognized data/information. In an example, the controller 84A recognizes the data/information as having a magnitude or value and calculates results based on the magnitude/value.

In one example of the system illustrated in FIG. 3, communication links 86A$_{1-4}$ connect to and provide communication between the pressure transmitters 82A$_{1-4}$ and the controller 84A, and which provide a way for the signals sent by the pressure transmitters 82A$_{1-4}$ to be delivered to the controller 84A. Optionally, the communication links 86A$_{1-4}$ are formed from a signal transmission medium, such as a conductive metal, composites, fiber optics, and combinations thereof. In an embodiment, the communication links $86A_{1-4}$ include waves, such as radio waves, light waves, and other electromagnetic waves, sonic waves, acoustic waves, and combinations thereof. While the communication links $86A_{1-4}$ are illustrated as following a dedicated path separate from the motor lead 30A and power cable 26A, in one example communication links $86A_{1-4}$ are included within the motor lead 30A and/or power cable 26A. Optionally, the signals communicated between sensors 48A, 50A, 54A, 56A, pressure transmitters $82A_{1-4}$, and controller 84A are transmitted via the motor lead 30A and/or power cable 26A.

Further in the example of FIG. 3, as the fluid F flows past the sensors 48A, 50A, 54A, 56A, pressure of the fluid F adjacent the sensors 48A, 50A, 54A, 56A is monitored by the sensors 48A, 50A, 54A, 56A. Signals are generated and sent to the controller 84A from the sensors 48A, 50A, 54A, 56A along the pressure transmitters $82A_{1-4}$ and communication links $86A_{1-4}$. In one non-limiting example of operation, at least one or more of a flow rate of the flow of fluid F, water cut, production cut, and fluid density is estimated by the controller 84A. Optionally, operation of the controller 84A is in accordance with the relationships of Equations 1 and 2, and per the steps described above. In an example, these values estimated by the controller 84A are based on pressure differentials between the sensors 48A, 50A, 54A, 56A.

Still referring to FIG. 3, a passage 88A, similar to passage 78A, is shown formed through wellhead assembly 70A, and which provides a pathway for the placement of communication links $86A_{1-4}$ through the wellhead assembly 70A. A packer 90A is also illustrated that is sealingly disposed in the annular space between pump assembly 20A and inner surface of casing 74A and which blocks the flow of fluid F past ESP 12A and forces the fluid F into inlets 24A so that the fluid can be pressurized for transport to the wellhead assembly 70A.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An apparatus for monitoring a flow of fluid in a subterranean well comprising: a first pipe section selectively disposed in the flow of fluid; a first pressure sensing system on the first pipe section that measures a first pressure loss of the flow of fluid along at least a portion of the first pipe section, the first pressure loss comprising first gravitational losses and first frictional losses; a second pipe section spaced axially away from the first pipe section and that is selectively disposed in the flow of fluid; a second pressure sensing system on the second pipe section that measures a second pressure loss of the flow of fluid along at least a portion of the second pipe section and that comprises second gravitational losses and second frictional losses, the second pipe section having an outer diameter that is less than an outer diameter of the first pipe section so that the second frictional losses are negligible with respect to the second gravitational losses; a controller in communication with the first and second pressure sensing systems and that calculates a pressure gradient along a portion of the second pipe section based on the equation $PG=(g)(\rho m)/((g_c)(144))$; and a communication media in communication with the controller and with the first and second pressure sensing systems, so that signals representing the first and second pressure losses are communicated to the controller.

2. The apparatus of claim 1, wherein the first and second pressure sensing systems each comprise a sensor system having axially spaced apart pressure sensors or a single pressure differential sensor for measuring the pressure loss.

3. The apparatus of claim 1, further comprising pressure transmitters in communication with the first and second pressure sensing systems and the communication media.

4. The apparatus of claim 1, wherein the first and second pipe sections are coupled together to define a metering assembly, and wherein an end of the metering assembly is attached to an electrical submersible pump.

5. The apparatus of claim 4, further comprising a power source in communication with the electrical submersible pump.

6. The apparatus of claim 5, wherein a power cable provides electrical communication between the power source and the electrical submersible pump, and wherein signals from the first and second pressure sensing systems are transmitted to the controller along the power cable.

7. The apparatus of claim 1, wherein the flow of fluid travels along a path that passes inside of the first and second pipe sections.

8. The apparatus of claim 1, wherein the flow of fluid travels along a path that passes through an annular space between the first and second pipe sections and a sidewall of the well.

* * * * *